A. DRURY.
HEADING DEVICE FOR KAFIR CORN AND THE LIKE.
APPLICATION FILED JAN. 11, 1912.
1,028,690.
Patented June 4, 1912.
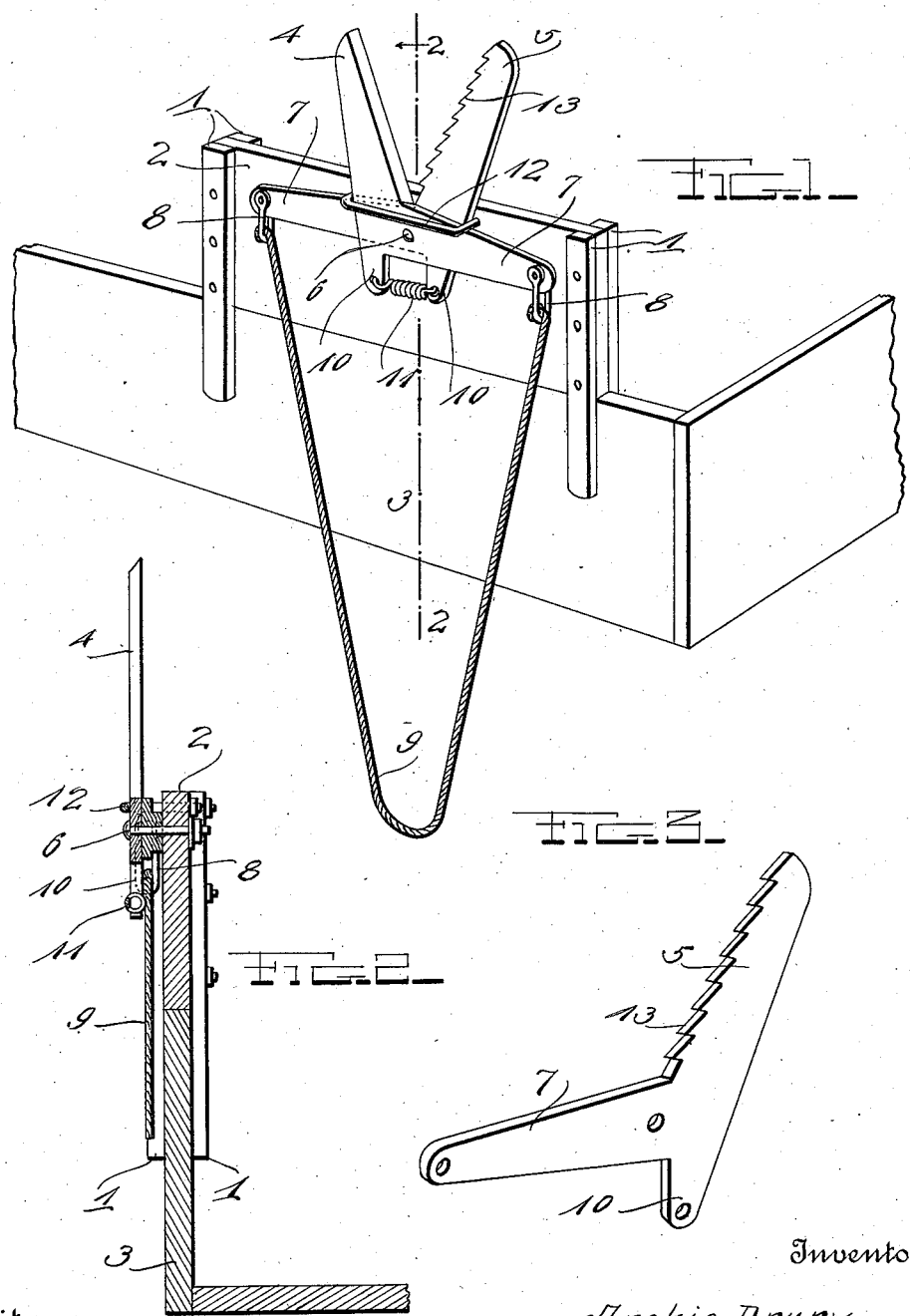
Witnesses
J. R. Pierce
C. E. Hunt
Inventor
Archie Drury
by H. R. Williamson & Co.
Attorneys

UNITED STATES PATENT OFFICE.

ARCHIE DRURY, OF ELGIN, KANSAS.

HEADING DEVICE FOR KAFIR CORN AND THE LIKE.

1,028,690. Specification of Letters Patent. Patented June 4, 1912.

Application filed January 11, 1912. Serial No. 670,605.

*To all whom it may concern:*

Be it known that I, ARCHIE DRURY, a citizen of the United States, residing at Elgin, in the county of Chautauqua and State of Kansas, have invented certain new and useful Improvements in Heading Devices for Kafir Corn and the Like; and I do declare the following to be a full, clear, and exact description of the invention, such as will enable others skilled in the art to which it appertains to make and use the same.

This invention relates to devices for heading Kafir corn, sugar cane and the like.

One object of the invention is to provide a machine of this character adapted to be attached to the body of a wagon whereby the heads may be quickly and easily severed from the bundled stalks of corn, the severed heads falling into the wagon, thus greatly expediting the severing and loading of the heads.

Another object is to provide a heading machine having a simple and improved operating mechanism adapted to be actuated by the foot of the operator.

With these and other objects in view, the invention consists of certain novel features of construction, and the combination of parts as will be more fully described and claimed.

In the accompanying drawings: Figure 1 is a perspective view of a portion of a wagon body showing the invention applied thereto; Fig. 2 is a cross sectional view on the line 2—2 of Fig. 1; Fig. 3 is a detail perspective view of one of the blades of the header.

In the embodiment of the invention, I provide a supporting frame comprising pairs of vertically disposed supporting bars or standards 1 between the upper portions of which are secured the ends of a blade supporting board or plate 2. The lower portions of the bars 1 project a considerable distance below the lower edge of the board 2 and said bars are spaced a suitable distance apart by the board to permit the same to be engaged with the side board 3 of a wagon bed or body to hold the device in operative position on the wagon.

The cutting mechanism of the header comprises blades 4 and 5 which are pivotally connected together at their inner ends as shown, said blades being also pivotally secured to the board 2 preferably by the same bolt 6 which pivots the blades together. On the inner ends of the blades 4 and 5 are arranged operating levers 7, said levers being formed at substantially right angles to the blades and projecting in opposite directions when the blades are pivoted together as shown.

In the outer ends of the levers 7 are secured eyes or links 8 to which are connected the ends of an operating cable 9 which hangs down from the levers in the form of a loop and is of sufficient length to be readily engaged by the foot of the operator whereby when pressure is applied to the cable, the levers 7 will be swung downwardly, thus bringing the cutting edges of the blades into operative engagement for severing the heads from the stalks placed between the blades. In order to open the blades after being closed in the manner described, the latter are provided on their inner ends with depending lugs 10 between which is secured a coiled spring 11 which, when the blades are brought together in operative engagement, is stretched and which when pressure is relieved from the blades, will again open the same as will be readily understood.

Arranged over or around the inner portions of the blades and above the levers 7 is a guide bar 12 which holds and guides the blades 4 and 5 when operated in the manner described, and which limits the opening movement of the blades by the spring 11. The blade 4 is preferably provided with a sharp beveled cutting edge, while the edge of the blade 5 is preferably notched to provide a series of teeth 13 which hold the stalks in position and prevent the same from slipping while being cut.

In the operation of the device the bundles of corn are lifted by the operator and the head ends of the same engaged between the blades in such position that when severed, said heads will fall into the body of the wagon to which the device is attached. After the bundles of corn have been thus engaged with the device, the latter is actuated by the engagement of the operator's foot with the loop in the cable 9 upon which sufficient pressure is exerted to force the edge of the blade 4 through the stalks, thereby severing the heads therefrom.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

The combination with a supporting frame, of a pair of pivotal connected cutters of substantially bell-crank form composed of upright blades one of which is provided with teeth and the other a cutting edge, said cutters having arms forming levers, guides secured to said support and embracing the cutters for limiting the open position of the same, lugs forming a continuation of said cutters and projecting below the pivotal connection of the cutters, a spring connecting the ends of said lugs, and a looped cable suspended from the outer ends of the levers, whereby, the said cutters are adapted to be simultaneously operated.

In testimony whereof I have hereunto set my hand in presence of two subscribing witnesses.

ARCHIE DRURY.

Witnesses:
 WALTER CARTER,
 GARLAND E. SIMS.

---

Copies of this patent may be obtained for five cents each, by addressing the "Commissioner of Patents, Washington, D. C."